US011852579B2

(12) United States Patent
Deurloo et al.

(10) Patent No.: US 11,852,579 B2
(45) Date of Patent: Dec. 26, 2023

(54) DEVICES, SYSTEMS, AND METHODS FOR TESTING SURFACE COVERING MATERIALS

(71) Applicant: COLUMBIA INSURANCE COMPANY, Omaha, NE (US)

(72) Inventors: Jordan Deurloo, Dalton, GA (US); Anthony Drevet, Dalton, GA (US); Chris Burns, Dalton, GA (US)

(73) Assignee: COLUMBIA INSURANCE COMPANY, Omaha, NE (US)

( * ) Notice: Subject to any disclaimer, the term of this patent is extended or adjusted under 35 U.S.C. 154(b) by 0 days.

(21) Appl. No.: 17/343,132

(22) Filed: Jun. 9, 2021

(65) Prior Publication Data
US 2021/0389230 A1    Dec. 16, 2021

Related U.S. Application Data

(60) Provisional application No. 63/039,644, filed on Jun. 16, 2020.

(51) Int. Cl.
*G01N 17/00*    (2006.01)
(52) U.S. Cl.
CPC ... *G01N 17/002* (2013.01); *G01N 2203/0242* (2013.01)
(58) Field of Classification Search
CPC ..... G01N 17/002; G01N 17/00; G01N 17/004
See application file for complete search history.

(56) References Cited

U.S. PATENT DOCUMENTS

| | | | | |
|---|---|---|---|---|
| 432,419 | A * | 7/1890 | Martinot | D06F 31/005 68/191 |
| 1,099,979 | A * | 6/1914 | Holt | B43M 11/04 118/268 |
| 2,521,921 | A * | 9/1950 | Kolar, Jr. | G01N 17/00 422/53 |
| 2,708,233 | A * | 5/1955 | Moore | H05B 3/80 219/541 |
| 3,123,789 | A * | 3/1964 | Schaschl et al. | G01N 17/00 324/71.2 |

(Continued)

FOREIGN PATENT DOCUMENTS

| | | | | |
|---|---|---|---|---|
| CN | 105445173 A | * | 3/2016 | ........... G01N 17/002 |
| DE | 2335374 A | * | 1/1975 | ............. A01G 27/00 |

(Continued)

OTHER PUBLICATIONS

ESPACENET Machine Translation of KR 101135722 B1 Which Originally Published On Apr. 16, 2012. (Year: 2012).*

(Continued)

*Primary Examiner* — David A. Rogers
(74) *Attorney, Agent, or Firm* — BALLARD SPAHR LLP

(57) ABSTRACT

An apparatus can comprise a basin that is configured to hold water. A heating source can be configured to heat the water in the basin to a temperature within a select range. A water-permeable substrate can extend across an upper surface of the basin, the water-permeable substrate simulating a subfloor (or other material upon which a covering material is positioned). Samples can be placed on the water-permeable substrate for a select duration to determine effects of moisture exposure from underneath, e.g., the subfloor.

9 Claims, 8 Drawing Sheets

(56) References Cited

U.S. PATENT DOCUMENTS

| | | | | |
|---|---|---|---|---|
| 3,390,962 | A * | 7/1968 | Goldsmith | G01N 33/558 |
| | | | | 436/514 |
| 3,444,356 | A * | 5/1969 | Finn | H05B 3/78 |
| | | | | 122/504 |
| 3,673,386 | A * | 6/1972 | Drugmand | H05B 3/78 |
| | | | | 219/534 |
| 3,674,985 | A * | 7/1972 | Ragault | H05B 3/78 |
| | | | | 392/501 |
| 4,069,019 | A * | 1/1978 | Suga | F16J 15/14 |
| | | | | 422/53 |
| 4,153,045 | A * | 5/1979 | Phelon | A47J 37/101 |
| | | | | 126/381.1 |
| 4,165,681 | A * | 8/1979 | Belinkoff | A47J 31/106 |
| | | | | 392/445 |
| 4,263,499 | A * | 4/1981 | Romance | H05B 1/0297 |
| | | | | 392/501 |
| 4,421,246 | A * | 12/1983 | Schultz | G01N 1/36 |
| | | | | 206/820 |
| 4,613,439 | A * | 9/1986 | Fuhs | B01D 35/28 |
| | | | | 210/474 |
| 4,667,522 | A * | 5/1987 | Kawahara | G01N 17/00 |
| | | | | 374/57 |
| 4,889,973 | A * | 12/1989 | Farinacci | A01K 63/065 |
| | | | | 119/245 |
| 4,957,624 | A * | 9/1990 | Peranio | C02F 1/02 |
| | | | | 210/138 |
| 5,227,137 | A * | 7/1993 | Monti | G01N 33/5304 |
| | | | | 422/537 |
| 5,317,476 | A * | 5/1994 | Wallace | H05F 3/025 |
| | | | | 361/216 |
| D361,646 | S * | 8/1995 | Hashimoto | D30/101 |
| 5,961,926 | A * | 10/1999 | Kolb | G01T 1/204 |
| | | | | 422/534 |
| 6,479,300 | B1 * | 11/2002 | Jiang | B01D 15/3828 |
| | | | | 210/635 |
| 6,878,344 | B2 * | 4/2005 | Mansky | G01N 33/367 |
| | | | | 436/178 |
| 7,032,540 | B2 * | 4/2006 | Bonner | A01K 1/03 |
| | | | | 119/455 |
| 7,458,288 | B2 * | 12/2008 | Polegato Moretti | G01N 15/08 |
| | | | | 73/865.6 |
| 8,359,906 | B2 * | 1/2013 | Shimada | G01N 17/002 |
| | | | | 73/73 |
| 8,438,940 | B2 * | 5/2013 | Takahashi | A61B 5/445 |
| | | | | 73/865.9 |
| 8,586,661 | B2 * | 11/2013 | Mercier | C08L 23/0876 |
| | | | | 525/274 |
| 8,763,480 | B2 * | 7/2014 | Shimada | G01N 17/00 |
| | | | | 73/865.6 |
| 9,060,642 | B1 * | 6/2015 | Armbrust | A47J 36/20 |
| 9,988,760 | B2 * | 6/2018 | Evans, Jr. | A47G 27/0475 |
| 10,357,909 | B2 * | 7/2019 | Hicks | B29C 45/0001 |
| 11,046,370 | B2 * | 6/2021 | Lu | B32B 7/12 |
| 2002/0110925 | A1 | 8/2002 | Mansky et al. | |
| 2012/0268149 | A1 | 10/2012 | Buehler et al. | |
| 2017/0205327 | A1 | 7/2017 | Yarbrough et al. | |
| 2021/0190672 | A1 * | 6/2021 | Zhang | G01N 33/38 |

FOREIGN PATENT DOCUMENTS

| | | | | |
|---|---|---|---|---|
| DE | 102015109250 A1 * | 12/2015 | | G01N 17/002 |
| GB | 116384 A * | 6/1918 | | |
| GB | 653657 | 5/1951 | | |
| GB | 2163328 A * | 2/1986 | | H05B 3/80 |
| GB | 2542161 A * | 3/2017 | | F24H 1/202 |
| KR | 101135722 B1 * | 4/2012 | | |

OTHER PUBLICATIONS

ESPACENET Machine Translation of DE 102015109250 A1 Which Originally Published On Dec. 17, 2015. (Year: 2015).*
ESPACENET Machine Translation of CN 105445173 A Which Originally Published On Mar. 30, 2016. (Year: 2016).*
"Aquarium Advice Forums: Cover over aquarium? Yes/No", Aquarium Advice, Oct. 6, 2010 (Year: 2010).*
Elemer M. Lang et al., "Performance of Wood Floor Systems Under Fluctuating Moisture Changes", Jul. 1992. (Year: 1992).*
Elemer M. Lang et al., "Performance of Oak Strip Flooring Systems Under Changing Environmental Conditions", Forest Products Society, May 1994. (Year: 1994).*
Underlayment Pad Specifications and Test Methods, North American Laminate Flooring Association, 2008. (Year: 2008).*
Pierre Blanchet, "Long-term Performance of Engineered Wood Flooring when Exposed to Temperature and Humidity Cycling", Forest Products Journal, vol. 58, No. 9, Sep. 2008. (Year: 2008).*
"Performance Standard for Wood Structural Panels", Voluntary Product Standard PS 2-18, U.S. Department of Commerce, Mar. 2019. (Year: 2019).*
ISA Search Report and Written Opinion for PCT/US2021/036832 dated Sep. 1, 2021.

* cited by examiner

DEVICES, SYSTEMS, AND METHODS FOR TESTING SURFACE COVERING MATERIALS

CROSS-REFERENCE TO RELATED APPLICATIONS

This application claims priority to and the benefit of the filing date of U.S. Provisional Patent Application No. 63/039,644, filed Jun. 16, 2020, the entirety of which is hereby incorporated by reference herein.

FIELD

The present application relates generally to surface coverings, and more particularly, to devices, systems, and methods for testing surface coverings.

BACKGROUND

Materials, such as flooring or wall covering materials, can be exposed to moisture from underneath (or behind) the materials, for example, the subfloor or drywall on which the materials are disposed, due to flooding, water intrusion, elevated levels of humidity, etc. the response of the materials to moisture exposure (e.g., bowing or end lift) can be important in development of the materials. Accordingly, moisture tests that simulate moisture exposure can be used in development of the materials to determine their resistance to moisture exposure.

Existing moisture tests take a long time (e.g., at least a month) to complete and require the use of a large testing system. These lengthy tests can slow product development, and it is often difficult to accommodate such large testing systems. Further, existing moisture tests are configured to simulate exposure of the materials to moisture from above the materials (e.g., spills on floor covering) and not from underneath or behind (e.g., from subfloor or drywall).

This background information is provided to reveal information believed to be of possible relevance to the present disclosure. No admission is necessarily intended, no should be construed, that any of the preceding information constitutes prior art against the present disclosure.

SUMMARY

Disclosed herein, in some aspects, is an apparatus comprising a basin having, an upper surface that defines a top opening and an interior space that is in communication with the top opening and configured to hold water. A heating source can be configured to heat the water in the basin to a temperature within a select range. A water-permeable substrate can extend across at least a portion of the upper surface and the top opening of the basin.

In some aspects, a method can comprise positioning at least one sample material on top of a water-permeable substrate, maintaining a temperature of water in a basin beneath the water-permeable substrate within a select range, and inspecting the at least one sample after a predetermined period of time.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description and appendix, which include examples, drawings, and claims. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an," and "the" include plural referents unless the context clearly dictates otherwise. Thus, for example, reference to "a sample" can include two or more such samples unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Further, unless specified or otherwise understood from context, the exemplary dimensions provided herein should be understood as optional and, therefore, non-limiting.

As used herein, the terms "optional" or "optionally" mean that the subsequently described event or circumstance may or may not occur, and that the description includes instances where said event or circumstance occurs and instances where it does not.

Figure 1:
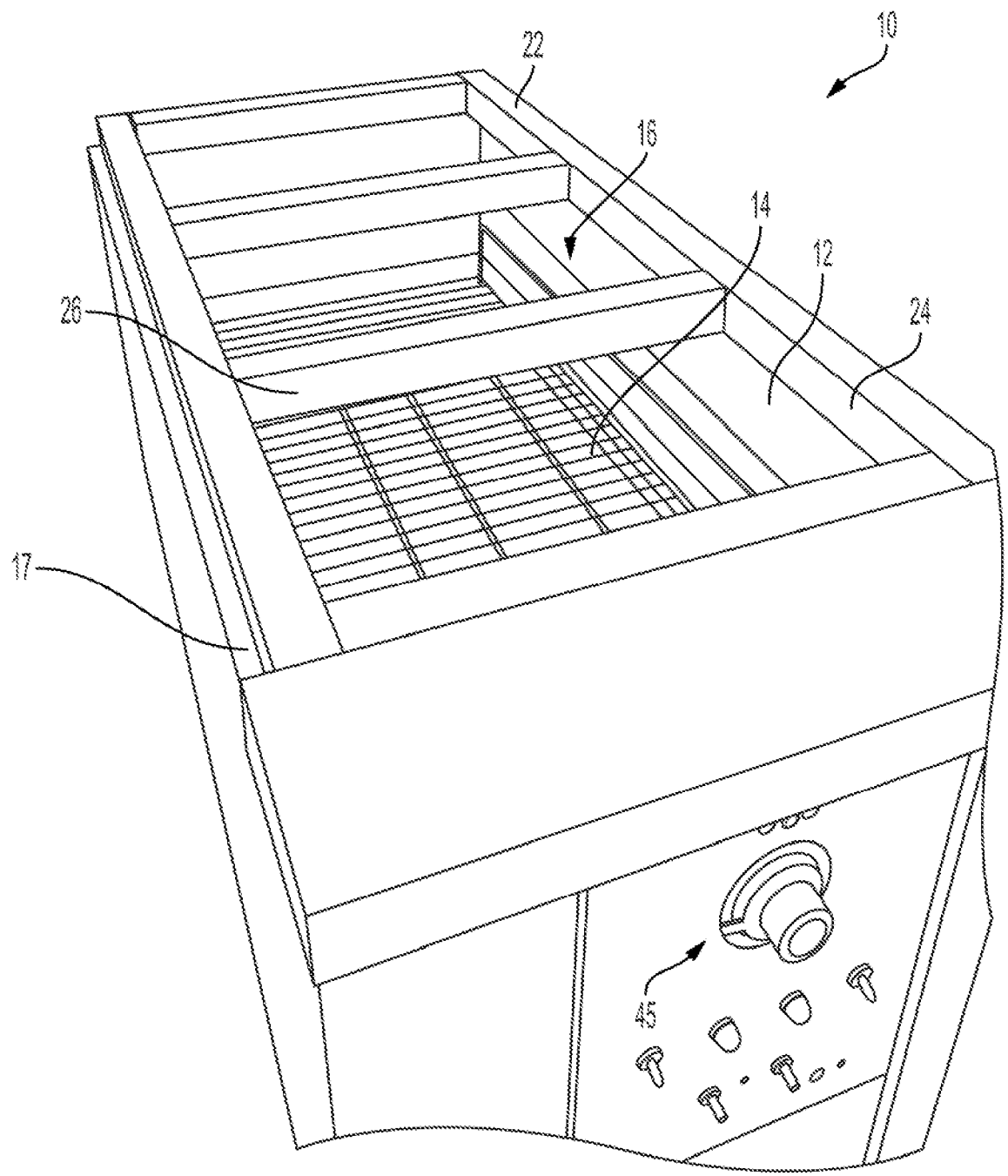
FIG. 1 is a perspective view of a test apparatus in accordance with embodiments disclosed herein.
Figure 2:
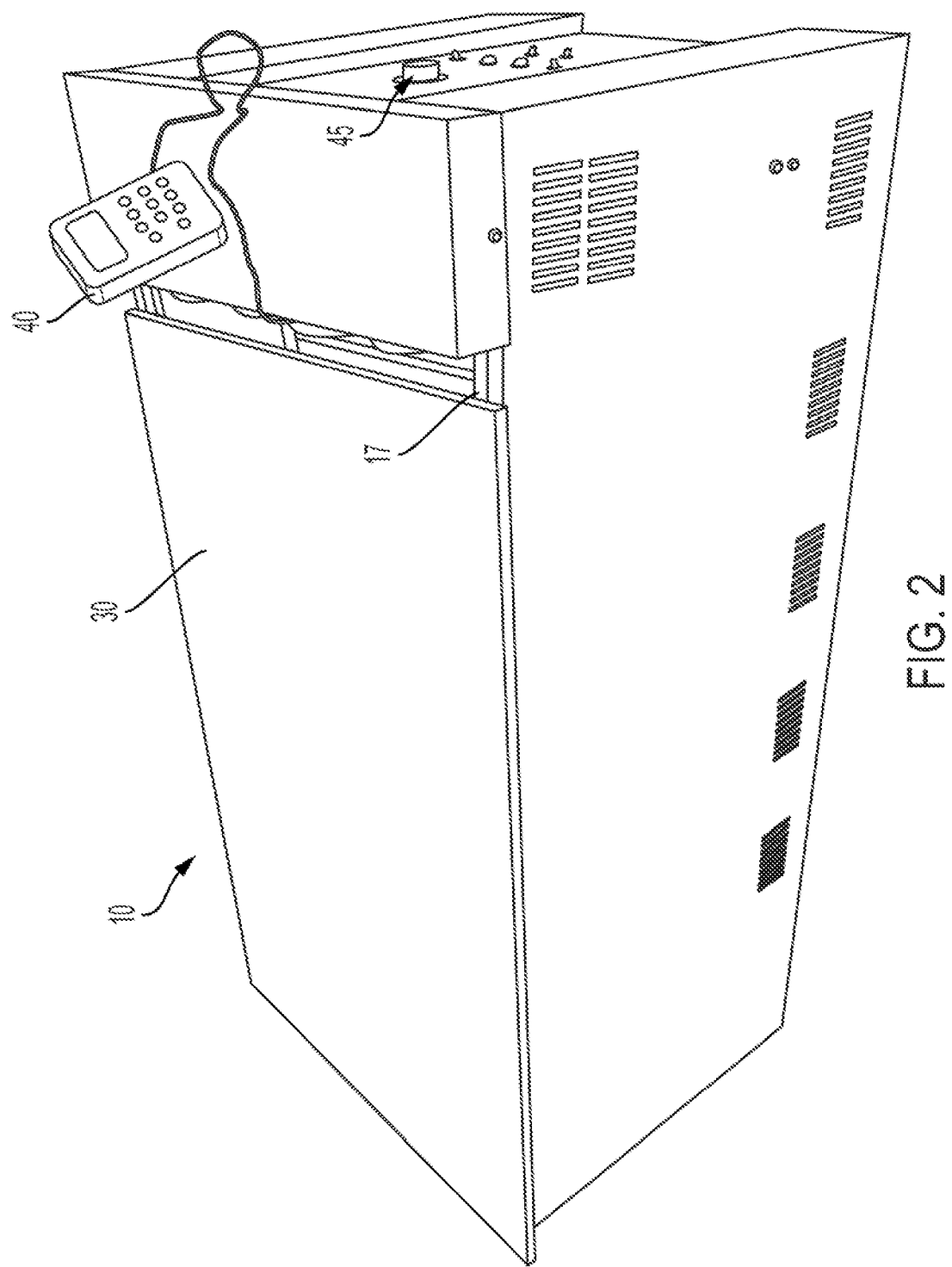
FIG. 2 is a perspective view of the test apparatus of FIG. 1 comprising a water-permeable substrate embodied as a cement board.
Figure 3:
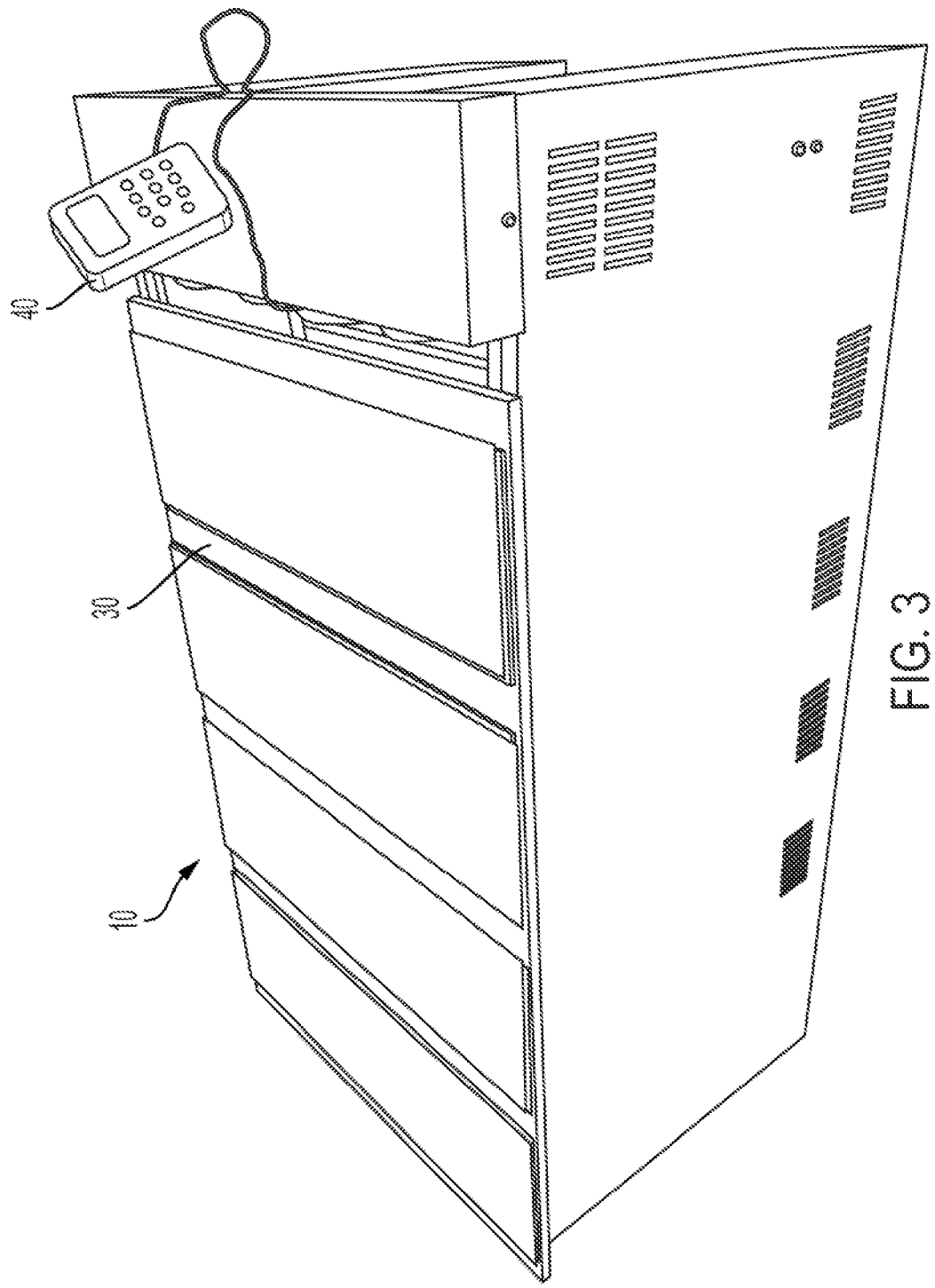
FIG. 3 is a perspective view of the test apparatus of FIG. 2 with samples positioned thereon for testing.

Disclosed herein, with reference to FIGS. 1-3, is a test apparatus 10. The test apparatus 10 can comprise a basin 12 that is configured to bold water or other liquid. A heating source 14 can be configured to heat the water (or other liquid) in the basin to a temperature within a select range. Preferably, the heating source can be submerged within the water (or other liquid). The select range can be, for example, between 110 and 150 degrees Fahrenheit (optionally, between 120 and 140 degrees Fahrenheit). The heating source 14 can comprise at least one heating element (optionally, a plurality of heating elements). In exemplary aspects, the at least one heating element can comprise at least one immersion heating element (e.g., a coil heating element). Optionally, the basin and heater can collectively be embodied by a heated water bath. In exemplary aspects, the heating elements can be in communication with a user interface 45 (e.g., a knob, a dial, a touchscreen, a key pad, or a remote computing device) that permits adjustment of a level of heat that is applied to the water or other test parameters. For example, the user interface can permit selection of a desired temperature, and in response to the user selection, a controller (e.g., a processor or processing unit) (not illustrated) in communication with the user interface can cause the heating elements to apply sufficient heat to reach or maintain the desired temperature. In further optional aspects, a circulation element (e.g., a stirrer) can be positioned within the water (or other liquid) to provide circulation of the water (or other liquid) within the basin.

In certain example embodiments, the user interface may be implemented as a software application on a computing device (not illustrated) that is communicatively coupled (wired or wireless) to the controller. In some example embodiments, the computing device may be a portable computing device (e.g., a smartphone, a tablet, or the like) that is wirelessly coupled to the controller of the basin 12, while in other example embodiments, the computing device may be a desktop computer that is coupled to the controller via a wired connection. The portable computing device can allow a user to remotely access, control, and/or monitor one or more test apparatuses, test parameters, and/or results.

The basin can have a top opening 16 having a length and a width. Optionally, in some aspects, the length can be less than 72 inches or less than 48 inches (e.g., between 30 and 42 inches). In further optional aspects, the length can be less than 38 inches (e.g., between 34 and 38 inches, or about 36 inches). In some optional aspects, the width can be between 18 and 24 inches (e.g., between 18 and 21 inches, or about 19 inches). However, it is contemplated that the opening 16 can have any length or width that is suitable for a particular flooring or surface covering sample (sample material).

A frame 22 can extend across at least a portion of the basin. Optionally, the frame 22 can have a length and a width that enable the frame to be positioned at least partially within the basin. Optionally, at least a portion of the frame 22 can be received within the top opening 16 of the basin 12. An upper surface of the frame can be flush (or substantially flush) with or above an upper rim 17 of the basin 12. The frame 22 can comprise a plurality of support members 24 that extend around a periphery of the basin, and transverse members 26 can extend across the width of the frame between the support members of the basin. The support members that extend around the periphery of the basin can define an opening having a width of from 18 inches to 18 inches, or about 16 inches. In some aspects, the frame 22 can comprise wood (e.g., treated wood). In other aspects, the frame 22 can include any other appropriate material that allows a water-permeable substrate 30 to be fastened thereto and hold the water-permeable substrate 30 in tension. Optionally, the frame can frictionally engage inner surfaces of the basin 12. Additionally, or alternatively, it is contemplated that the frame can be mounted to the basin 12 using one or more fasteners, such as bolts or clamps. Additionally, or alternatively, it is contemplated that the basin 12 can comprise one or more platforms (not shown) that project inwardly from inner surfaces of the basin to engage a bottom surface of the frame 22 and support the frame 22 at a desired height. In further aspects, it is contemplated that the frame 22 and the basin 12 can be provided as a single, monolithic structure that can optionally be formed as a single piece. In still further aspects, the frame can be omitted.

A water-permeable substrate 30 can extend across (optionally, over) the opening 16 of the basin 12. Optionally, the water-permeable substrate 30 can rest on upper surfaces (e.g., the upper rim 17 of the basin 12 and/or frame 22. In some aspects, the water-permeable substrate 30 can comprise one or more cement boards such as, for example, HARDIEBACKER® board (James Hardie Building Products, Inc.). The cement board can optionally be one half inch in thickness. However, it is contemplated that a cement board of any desired thickness can be selected based on the parameters of a subfloor or drywall that is to be simulated by the test apparatus 10. The lateral dimensions of the cement board can optionally be 21 inches by 35 inches. However, it is contemplated that the cement hoard can be provided with any desired dimensions. In some aspects, the cement board can have a smooth face surface and an opposing, rough face surface. In these aspects, it is contemplated that the cement board can be oriented so that the rough surface faces the water in the basin and the smooth surface faces upwardly (away from the water in the basin). In some aspects, the water-permeable substrate 30 can extend across the entire, or substantially the entire (e.g., across at least 80%, or at least 90% of the area), top opening 16 of the basin 12.

Figure 6:
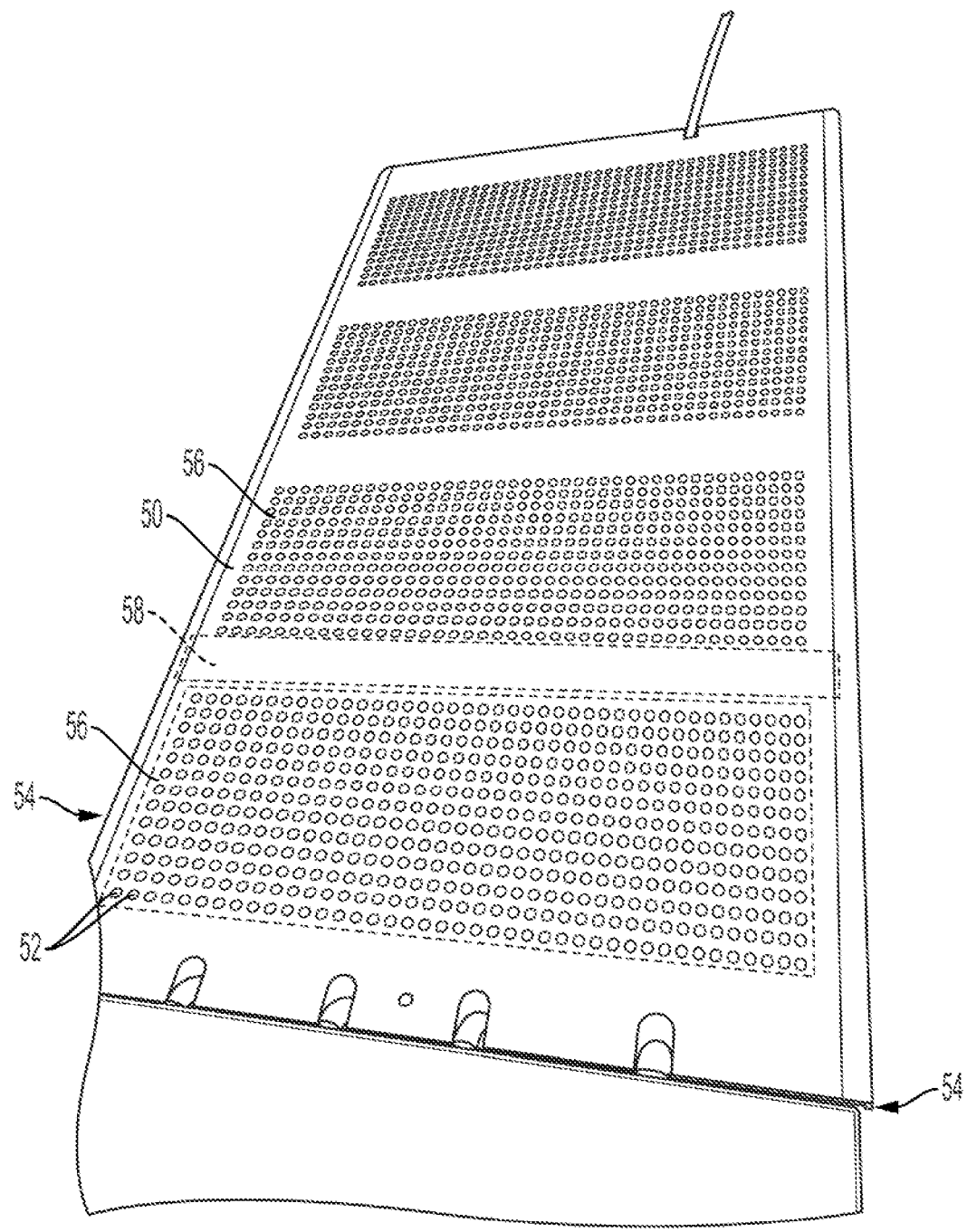
FIG. 6 is a perspective view of a test apparatus comprising a water-permeable substrate embodied as a perforated metal sheet.

Referring to FIG. 6, in further aspects, the water-permeable substrate 30 can comprise a sheet 50 (or plate) that defines a plurality of perforations 52 therethrough to allow moisture to pass from the test bed. In some optional aspects, the perforations 52 can be circular, having respective diameters of between 2 mm and 20 mm or from about 4 mm to about 12 mm (e.g., about 8 mm). The perforations can optionally be spaced by between 2 mm and 10 mm or between about 3 mm and about 8 mm (e.g., about 4 mm). In some aspects, the perforations 52 be equally spaced in a rectangular grid. Optionally, the sheet 50 can have a planar surface. In exemplary aspects, the sheet 50 can comprise or consist of metal. In other exemplary aspects, the sheet 50 can comprise or consist of rigid polymer material. Optionally, the sheet 50 can rest on the basin 12 (e.g., on the upper rim 17). The sheet 50 can define downwardly extending flanges 54 extend below the upper rim of the basin 12 on opposing sides of the basin 12. In this way, the downwardly extending flanges 54 can inhibit lateral movement of the sheet 50.

It is contemplated that the perforations 52 of the sheet 50 can be arranged in one or more perforated areas 56, wherein adjacent perforated areas are spaced by unperforated areas 58. Optionally, the unperforated areas 58 can have a width—corresponding to a spacing between adjacent perforated areas—of at least one inch (e.g., at least 2 inches, about 2.5 inches, at least 2.5 inches, or more, or from about 1 inch to about 4 inches). Each perforated area 56 can have a plurality of perforations 52 that are arranged in an organized pattern (e.g., evenly spaced, evenly-sized perforations) or in a random pattern. Optionally, the perforated areas can be sized so that the sample material covers an entire perforated area 56 or an entirety of two or more perforated areas. For example, in some aspects, the sample material can have a length and a width, and the perforated area can have a length that is between 80 and 100% (e.g., about 95%) of the length of the sample material and a width that is between 80 and 100% (e.g., about 95%) of the width of the sample material. In this way, the sample material thereon is subject to moisture only from the surface placed against the water-permeable substrate, and not from vapor flowing along the edges or across the opposing side of the sample material. In this way, the test apparatus 10 can simulate moisture exposure from a subfloor. In some optional aspects, the perforated area 56 can have dimensions of about 19 inches (e.g., 18.75 inches) by about 6 inches (e.g., 6.3 inches). Such a perforated area 56 can be used to test sample materials having dimensions of 21 inches by 7 inches. Thus, the perforated area can cover about 80% of the sample material. In further aspects, the perorated area can have any suitable dimensions to cooperate with the sample material. For example, in some optional aspects, the perforated area can have a width from about two to about 20 inches and a length from about 4 to about 60 inches.

Figure 7:
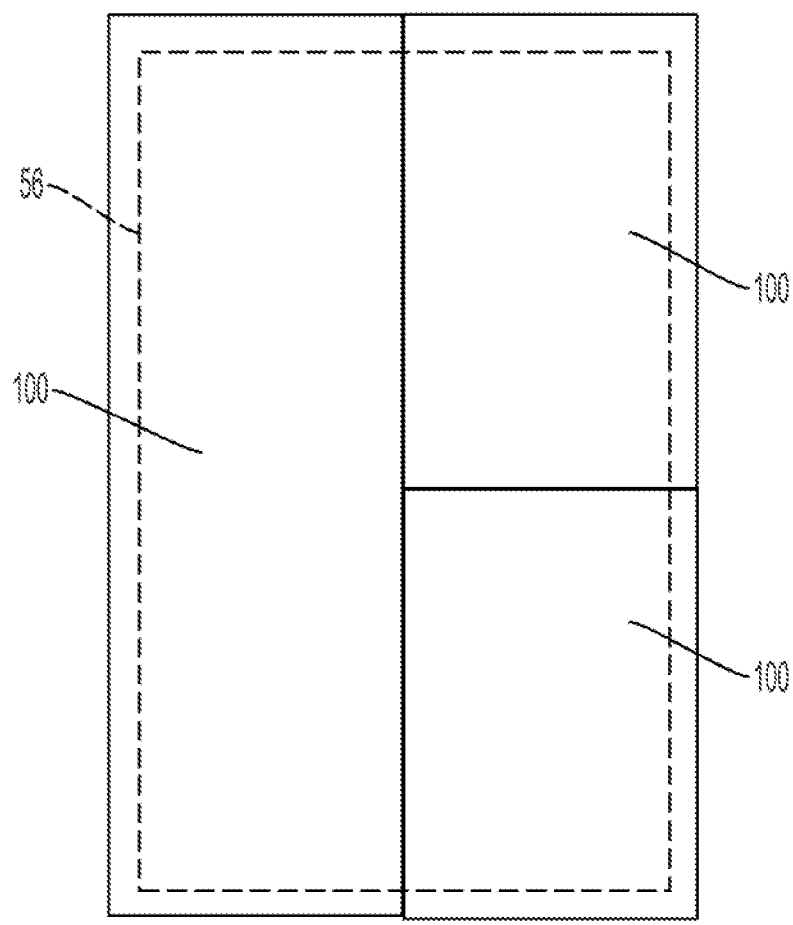
FIG. 7 is a schematic top view of a test apparatus comprising interlocking flooring components thereon.

Optionally, referring to FIG. 7, at least two samples can be securely coupled together (e.g., interlocked) via coupling features (e.g., interlocking features) or via adhesive while on the test apparatus 10. For example, the samples can comprise tongue-and-groove or click-lock interlocking features that are interlocked while the samples are on the test apparatus 10. In further aspects, the at least two samples can be positioned adjacent to each other (e.g., optionally, touching) while remaining uncoupled. In this way, the test apparatus 10 can simulate moisture exposure to a surface covering in an in-use configuration. In some aspects in which the water-permeable substrate defines one or more perforated areas 56, the perforated areas can have dimensions of between 80 and 100% (e.g., about 95%) of a collective length of the interlocked sample materials and a width that is between 80 and 100% (e.g., about 95%) of a collective width of the interlocked sample materials. Accordingly, the dimensions of the perforated areas 56 can be selected based on the dimensions of the adjacent and, optionally, interlocked or otherwise coupled sample materials.

In some aspects, the cement boards or other water-permeable substrate 30 can be coupled to the frame and/or basin on opposing sides of the top opening 16 via one or more fasteners. For example, the cement board(s) or other water-permeable substrate 30 can be coupled to the frame 22 via screws, bolts, or other fasteners that can be driven into the frame to secure the water-permeable substrate 30 in place and ensure that the water-permeable substrate 30 remains flat during testing. As another example, the cement board(s) or other water-permeable substrate 30 can be coupled to the frame 22 and/or a portion of the basin 12 using a clamp or other selectively releasable fastener. In this way, the water-permeable substrate 30 can be held in tension to inhibit sagging. Deformations such as sagging, cupping, or edge lift, etc., formed in the water-permeable substrate 30 that is configured to simulate a subfloor or drywall may negatively affect the test results. As such, fastening the water-permeable substrate 30 to the frame 22 may prevent the deformations and the resulting inaccuracies or faulty test results. In some example embodiments where the water-permeable board 30 may not undergo significant deformation, the frame 22 may be optional. That is, in said example embodiments, the water-permeable substrate 30 may be directly disposed on the basin 12 such that the water-permeable substrate 30 at least partially covers the top opening 16 of the basin 12.

In further optional aspects, the water-permeable substrate 30 can comprise one or more metal studs (not illustrated) or a perforated material, such as a perforated board of any other material and configuration based on the type of subfloor or drywall that is to be simulated by the test apparatus 10. In general, it is contemplated that the water-permeable substrate 30 can comprise any conventional slab or subfloor material or drywall or a material that simulates a slab or subfloor material or drywall as is known in the art. In further optional aspects, the water-permeable substrate can comprise drywall (e.g., SHEETROCK). It is contemplated that the test apparatus 10 can be configured to expose the samples to vapor moisture without allowing the samples to get wet (i.e. without allowing liquid to contact or collect on the surface of the sample). In exemplary aspects, it is contemplated that the test apparatus 10 with the water-permeable substrate 30 can be configured to simulate the performance of a sample material (e.g., floor or wall covering) disposed on a wet slab or wet subfloor or wet drywall that would expose the floor or wall covering disposed thereon to moisture from underneath the floor covering behind the wall covering.

It is contemplated that the select temperature range for the water, the size of the basin 12, and/or the height at which the water-permeable substrate 30 is placed above the surface of the water in the basin 12 can be selected to maintain a desired rate of vapor penetrating and/or being emitted through the water-permeable substrate 30. In some optional aspects, a desired vapor emission rate can correspond to a desired humidity. In exemplary aspects, the desired vapor emission rate can optionally be measured according to ASTM F1869, which is entitled "Standard Test Method for Measuring Moisture Vapor Emission Rate of Concrete Subfloor Using Anhydrous Calcium Chloride." The test can utilize a lidded container, calcium chloride crystals in a dome over the water-permeable substrate, and a scale to measure a change in mass. The moisture vapor emission rate (MVER) can optionally be monitored during testing. It is further contemplated that the MVER can be repeatably obtained fur select test parameters (e.g., water temperature and distance between the water and the water-permeable substrate 30) so that the MVER does not need to be monitored during each test. In some optional aspects, the MVER can be set at between 120 and 140 lbs per 24 hours per 1000 square feet (e.g., optionally about 130 lbs per 24 hours per 1000 square feet).

One or a plurality of samples 100 (sample materials) can be prepared for testing with the apparatus 10. In some aspects, the sample or samples can be rectangular, having a central longitudinal axis 102, opposing longitudinal edges 104, and opposing end edges 106. The samples 100 can have, or be cut to, a select length and width (e.g., a length between 18 and 22 inches—optionally, 21 inches—and a width between 6 and 8 inches—optionally 7 inches). In some aspects, the width of the sample 100 can be no greater than 7 inches. For samples having a manufacturing direction, the samples can be cut to have a length extending in the manufacturing direction of the sample 100. The sample 100 can be a floor or wall covering, such as a board or surface panel. In various optional aspects, the sample material 100 can comprise wood, polymer, or composite material.

Figure 4:
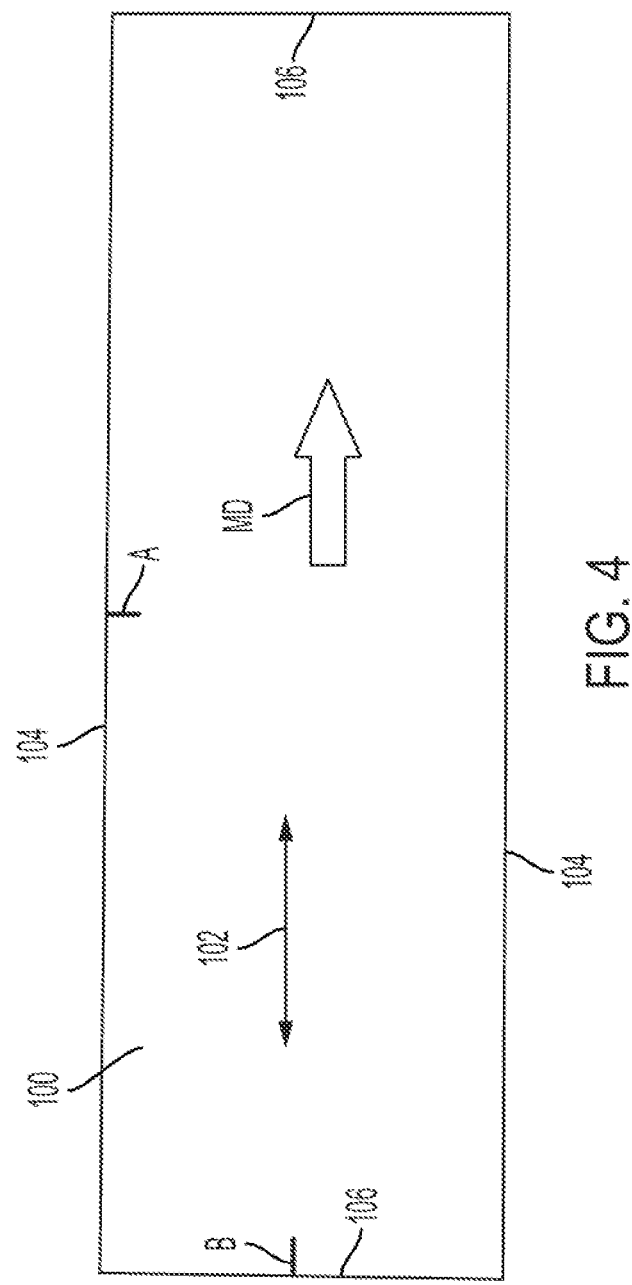
FIG. 4 is a top view of a sample material for testing with the test apparatus as disclosed herein.
Figure 8:
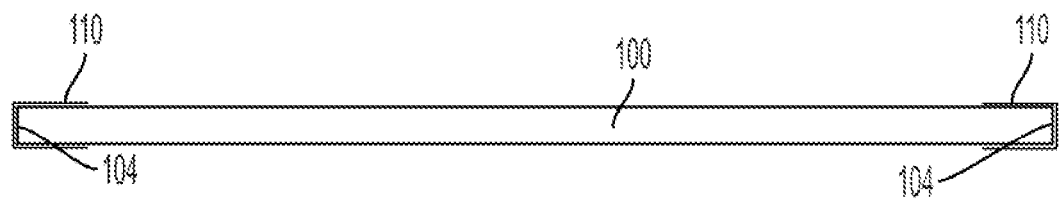
FIG. 8 is a schematic diagram of an end view of a sample with a covering on its edges.

Referring to FIG. 8, it is further contemplated that the edges of the sample material can be covered to further inhibit exposure to moisture other than from the surface of the sample material resting against the moisture-permeable substrate 30. For example, metal foil 110 can be used to cover the edges (e.g., the longitudinal edges 104 and/or the end edges 106 (FIG. 4)). In further aspects, a polymer wrap (e.g., plastic food wrap) or other moisture-impermeable material or a water-resistant coating can be applied to the edges of the sample to inhibit moisture exposure thereat. In further optional aspects, a cover (e.g., the same sheet of metal foil 110 or another sheet of metal foil) or coating can be disposed across an upper surface (opposite the surface positioned against the substrate) to inhibit moisture from entering the material sample from said covered upper surface.

Optionally, the samples 100 can be conditioned prior to exposing the samples 100 to moisture. For example, the samples 100 can be positioned on a flat surface for 24 hours and kept it 70° F.±2° F. and 50%±5% humidity.

Figure 5A:
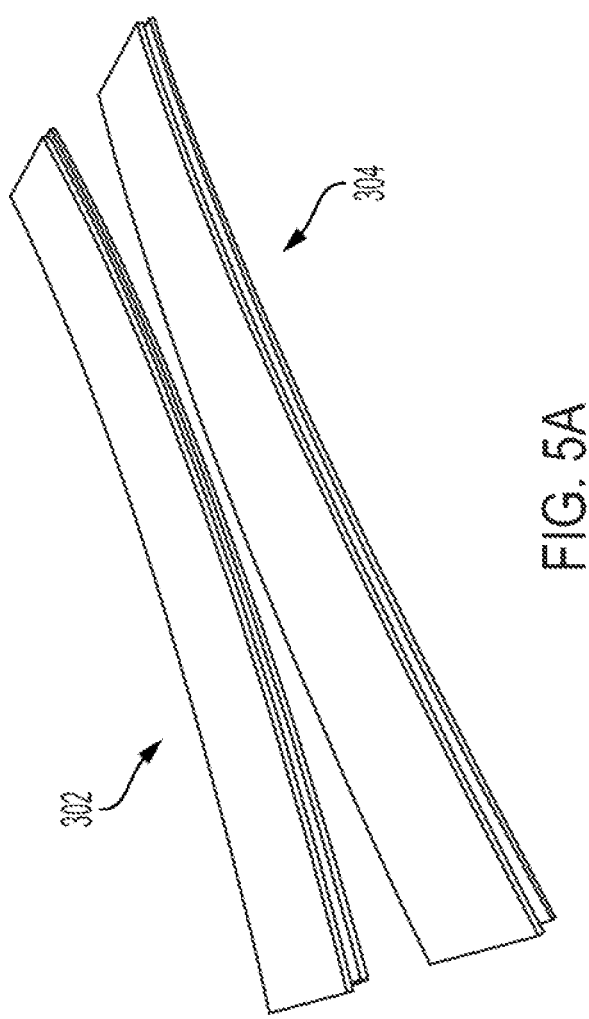
FIG. 5A shows a perspective view of sample materials with end lift and bowing.
Figure 5C:
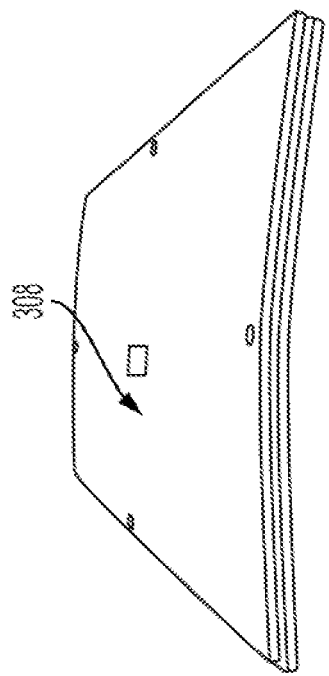
FIG. 5C shows a perspective view of a sample material with doming.
Figure 5B:
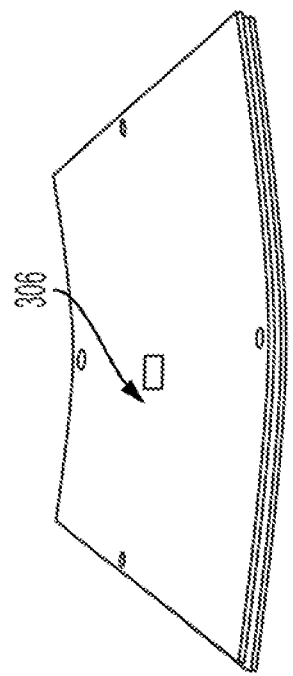
FIG. 5B shows a perspective view of a sample material with cupping.

Referring also to FIG. 5, prior to testing, the samples 100 can initially be measured for initial end lift 302 (curvature about a short axis that is perpendicular to the longitudinal axis 102 causing opposing end edges 106 to lift upwardly), bowing 304 (curvature about the short axis causing opposing end edges 106 to bend downwardly and raise a central portion of the sample relative to the central longitudinal axis 102), cupping 306 (upward curvature about the central longitudinal axis 102, causing the longitudinally extending edges 104 to lift upwardly), or doming 308 (downward curvature about the central longitudinal axis 102, causing the central longitudinal axis to be lifted by the longitudinally extending edges 104). In further aspects, it is contemplated that the samples can be square (thus not having longitudinal and short axes), and the bowing and end lift can be measured relative to a first axis extending between opposing side edges, and the cupping and doming can be measured relative to a second axis that is perpendicular to the first axis. In still further aspects, it is contemplated that the samples can be any other appropriate shape, and the sample curvature can be measured relative to any suitable axis extending across the surface of the sample. Initial cupping 306 or bowing 304 can be measured at or about halfway along the length of the sample (e.g., at point A in FIG. 4), and initial end lift 302 or doming 308 can be measured at or about halfway along the width of the sample at each end (e.g., at point B in FIG. 4). For example, the samples 100 can be placed on a surface plate (e.g., a granite slab or other machined flat surface) (not illustrated), and a measurement apparatus (not illustrated) can be used to measure spacing between the sample and the surface plate at selected locations such as those described above). Optionally, in some aspects, the measurement apparatus can comprise pin gauges (e.g., VERMONT gauges) and/or feeler gauges can be inserted between the sample and the surface plate. In some aspects, feeler gauges can be used for measuring spacing (between the sample and the surface plate) that is less than 0.010 inches, and pin gauges can be used for measuring spacing that is greater than or equal to 0.010 inches. However, it is contemplated that the gauges can be configured to measure spacing within other ranges. In other optional aspects, the measurement apparatus can comprise at least one laser distance measurer or laser range finder (optionally, a plurality of laser distance measurers or laser range finders) as are known in the art. In these aspects, the laser distance measurers or laser range finders can be positioned at suitable locations for measuring the spacing between the sample and the surface plate.

Optionally, in exemplary aspects, it is contemplated that the measurement apparatus can be provided as a separate component from the basin 12 and the surface plate. Alternatively, it is contemplated that the measurement apparatus can be operatively coupled to the surface plate such that the sensors (e.g., gauges and/or laser distance measurers) are positioned to measure spacing between the sample and the surface plate when the sample is positioned at a predetermined location on the surface plate. For example, the sensors can be positioned to measure spacing at prescribed locations for samples having particular dimensions, and the measurements can be performed when a sample having those dimensions is properly aligned on the surface plate. Optionally, in further aspects, it is contemplated that the surface plate can be provided as a separate component from the basin 12.

After initial measurements are taken, the samples 100 can be positioned on top of the water-permeable substrate 30. The samples 100 can be spaced from each other as illustrated in the example embodiment of FIG. 3. In exemplary aspects, sequential samples can be spaced apart by a selected distance (or distances). In some aspects, the sequential samples can be evenly spaced by the selected distance. Optionally, the selected distance can be at least ¼ inch. End edges of the samples can optionally be aligned with longitudinal edges of the water-permeable substrate 30 so that the lengths of the samples are parallel to the width of the water-permeable substrate 30 (e.g., cement board).

The samples 100 can remain on the apparatus 10 for a select test duration. The test duration can be 12 hours or less, 24 hours or less, about 48 hours, or 48 hours or less, or 72 hours or less, or between 12 hours and 24 hours, between 24 and 48 hours, or between 48 and 72 hours or more than 72 hours. The water can be maintained within the select temperature range during the select test duration. A thermometer 40 can be used to confirm the water temperature. The water level in the basin can be maintained within a select depth range (e.g., between 4 inches and 8 inches deep). In exemplary aspects, it is contemplated that the select depth range can ensure that the heating source remains submerged within the water and/or the vertical spacing between the surface of the water and a bottom surface of the water-permeable substrate remains within a selected range (e.g., optionally, between 4 inches and 14 inches, or between 11 inches and 13 inches, or about six inches).

After the select test duration, the samples can be removed from the test apparatus and inspected. Optionally, the samples can be allowed a recovery time (e.g., one hour, about one hour, less than ½ hour, between 0.5 and 4 hours, or more than 4 hours after removal from the apparatus 10 and prior to inspection. In some aspects, inspection can comprise measuring sample bowing, cupping, doming, and/or end lift. For example, as described above, cupping or doming can be measured at or about halfway along the length of the sample (e.g., at point A in FIG. 4), and bowing or end lift can be measured at or about halfway along the width of the sample at each end (e.g., at point B in FIG. 4) using the measurement apparatus. The cupping, doming, bowing, and end lift can be compared to the corresponding initial measurements prior to moisture exposure.

In certain examples, the user interface (e.g., software application) on a remote computing device may include data fields that are configured to be manually populated by a user with cupping, doming, bowing, and/or end lift data (e.g., spacing data/measurements) obtained using the measurement apparatus. In some examples, the measurement apparatus may be configured to transmit (via wired connection or wirelessly) the measured cupping, doming, bowing, and/or end lift data (e.g., spacing) to the remote computing device having the user interface features installed therein. Responsive to receiving the cupping, doming, bowing, and/or end lift data, the remote computing, device may be configured to process the received cupping, doming, bowing, and/or end lift data (before and after moisture exposure) and generate a result indicating whether the samples) 100 pass or fail one or more test requirements (e.g., cupping, doming, bowing, and/or end lift requirements).

In further aspects, the inspection of the at least one sample can include evaluation of one or more of the following: delamination of a top surface of the at least one sample: delamination of a pad of the at least one sample; swelling of the at least one sample; mold growth on the at least one sample; or discoloration of the top of the at least one sample. Said inspections may be done manually or using appropriate sensors or apparatuses.

The test apparatus 10, as described herein, provides various advantages over conventional test systems. For example, the test apparatus 10 can provide a method for studying effects on floor or wall coverings of moisture exposure from underneath the floor covering (e.g., from the subfloor) or behind the wall covering (e.g., from the drywall). Further, the test apparatus 10 can significantly reduce the time required to obtain moisture results (e.g., from at least a month to one to two days). This short test duration, as well as the ability to test multiple samples simultaneously, can significantly reduce product development times. Additionally, the test apparatus 10 is significantly more compact than conventional test systems, reducing its use of space and enabling portability of the test apparatus.

EXEMPLARY ASPECTS

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: An apparatus comprising: a basin having an upper surface that defines a top opening, and an interior space that is in communication with the top opening and configured to hold water; a heating source that is configured to heat the water in the basin to a temperature within a select range; and a water-permeable substrate extending across at least a portion of the upper surface and the top opening of the basin.

Aspect 2: The apparatus of aspect wherein the select range is between 110 and 150 degrees Fahrenheit.

Aspect 3: The apparatus of aspect 2, wherein the select range is between 120 and 140 degrees Fahrenheit.

Aspect 4: The apparatus of any one of the preceding aspects, wherein the water-permeable substrate comprises cement board.

Aspect 5: The apparatus of any one of the preceding aspects, wherein the cement board comprises Hardiebacker board.

Aspect 6: The apparatus of any one of the preceding aspects, further comprising a support frame that extends across at least a portion of the basin.

Aspect 7: The apparatus of aspect 6, wherein the water-permeable substrate is coupled to the support frame on opposing sides of the basin.

Aspect 8: The apparatus of aspect 7, wherein the water-permeable substrate is coupled to the support via at least one fastener.

Aspect 9: The apparatus of any one of aspects 1-3, wherein the water-permeable substrate comprises a material sheet defining a plurality of perforations.

Aspect 10: The apparatus of aspect 9, wherein the material sheet is a metal sheet.

Aspect 11; The apparatus of aspect 9 or aspect 10, wherein the plurality of perforations comprises at least one perforated area.

Aspect 12: The apparatus of aspect 11, wherein the plurality of perforations comprises at least two perforated areas, wherein adjacent perforated areas of the at least two perforated areas that are separated by a respective unperforated area.

Aspect 13: The apparatus of aspect 12, wherein the unperforated area has a width of at least one inch.

Aspect 14: The apparatus of any one of aspects 9-13, wherein the at least one perforated area is configured for use with a sample material having a length and a width, wherein the at least one perforated area has a length that is between 80 and 100% of the length of the sample material, wherein the at least one perforated area has width that is between 80 and 100% of the width of the sample material.

Aspect 15: The apparatus of any one of the preceding aspects, wherein the basin has a length between 30 and 42 inches and a width between 16 and 24 inches.

Aspect 16: The apparatus of any one of the preceding aspects, wherein the water-permeable substrate covers substantially an entirety of the top opening of the basin.

Aspect 17: A method comprising: positioning at least one sample material on top of a water-permeable substrate; maintaining a temperature of water in a basin beneath the water-permeable substrate within a select range; and inspecting the at least one sample material after a predetermined period of time.

Aspect 18: The method of aspect 17, wherein the select range is between 110 and 150 degrees Fahrenheit.

Aspect 19: The method of aspect 18, wherein the select range is between 120 and 140 degrees Fahrenheit.

Aspect 20: The method of any one of aspects 17-19, wherein the at least one sample material comprises a plurality of sample materials.

Aspect 21: The method of any one of aspects 17-20, further comprising, prior to positioning the at least one sample material on top of the water-permeable substrate, measuring at least one of: sample bowing, sample cupping, sample doming, or end lift of the sample Aspect 22: The method of any one of aspects 17-21, wherein inspecting the at least one sample material after the predetermined period of time comprises determining at least one of: sample bowing, sample cupping, sample doming, and end lift of the sample.

Aspect 23: The method of any one of aspects 17-22, wherein inspecting the at least one sample material after the predetermined period of time comprises inspecting at least one of: delamination of a top surface of the at least one sample material, delamination of a pad of the at least one sample material, swelling of the at least one sample material, mold growth on the at least one sample material, and discoloration of the top of the at least one sample material.

Aspect 24: The method of any one of aspects 17-23, wherein the predetermined time is at least 24 hours.

Aspect 25: The method of any one of aspects 17-24, wherein the predetermined time is less than 72 hours.

Aspect 26: The method of any one of aspects 17-25, wherein the predetermined time is about 48 hours.

Aspect 27: The method of any one of aspects 17-26, wherein inspecting the at least one sample material after the predetermined period of time comprises beginning inspection of the at least one sample material within five minutes after removal from the water-permeable substrate.

Aspect 28: The method of any one of aspects 17-27, further comprising maintaining a water level within a selected depth range.

Aspect 29: The method of any one of aspects 17-28, wherein the at least one sample has a length between 18 and 22 inches and a width between six and eight inches.

Aspect 30: The method of any one of aspects 17-29, wherein the at least one sample material comprises a floor covering material.

Aspect 31: The method of any one of aspects 17-30, wherein the at least one sample material comprises a wall covering material.

Aspect 32: The method of any one of aspects 17-31, wherein the method is performed with the apparatus as in any one of aspects 1-10.

Aspect 33: The method of any one of aspects 17-32, wherein the at least one sample material comprises at least a first sample material and a second sample material.

Aspect 34: The method of any one of aspects 17-33, wherein positioning at least one sample material on top of a water-permeable substrate comprises interlocking the first and second sample materials.

Aspect 35: The method of any one of aspects 17-34, wherein the sample has a perimeter defined by at least one edge, the method further comprising covering at least one of the at least one edge with a moisture-impermeable material.

Although several embodiments of the invention have been disclosed in the foregoing specification and the following appendices, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed herein, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A method comprising:
    positioning at least one sample material on top of a water-permeable substrate of an apparatus comprising:
        a basin having an upper surface that defines a top opening, and an interior space that is in communication with the top opening and configured to hold water;
        a heating source that is configured to heat the water in the basin to a temperature within a select range; and
        the water-permeable substrate, wherein the water-permeable substrate extends across at least a portion of the upper surface and the top opening of the basin;
    maintaining a temperature of water in a basin beneath the water-permeable substrate within a select range; and
    inspecting the at least one sample material after a predetermined period of time,
    wherein the at least one sample material comprises a floor covering material or a wall covering material,
    wherein performing the method subjects the at least one sample material to moisture only from a surface of the at least one sample placed against the water-permeable substrate.

2. The method of claim 1, wherein the select range is between 110 and 150 degrees Fahrenheit.

3. The method of claim 1, wherein the sample has a perimeter defined by at least one edge, the method further comprising covering at least one of the at least one edge with a moisture-impermeable material.

4. The method of claim 1, wherein inspecting the at least one sample material after the predetermined period of time comprises determining at least one of: sample bowing, sample cupping, sample doming, and end lift of the sample material.

5. The method of claim 1, wherein inspecting the at least one sample material after the predetermined period of time comprises inspecting at least one of: delamination of a top surface of the at least one sample material, delamination of a pad of the at least one sample material, swelling of the at least one sample material, mold growth on the at least one sample material, and discoloration of the top of the at least one sample material.

6. The method of claim 1, wherein the predetermined time is less than 72 hours.

7. The method of claim 1, wherein the surface covering material is a floor covering material.

8. The method of claim 1, wherein the at least one sample material comprises at least a first sample material and a second sample material.

9. The method of claim 8, wherein positioning at least one sample material on top of a water-permeable substrate comprises interlocking the first and second sample materials.

* * * * *